(No Model.) 3 Sheets—Sheet 1.
M. G. FARMER.
APPARATUS FOR REFINING COPPER BY ELECTROLYSIS.
No. 315,265. Patented Apr. 7, 1885.
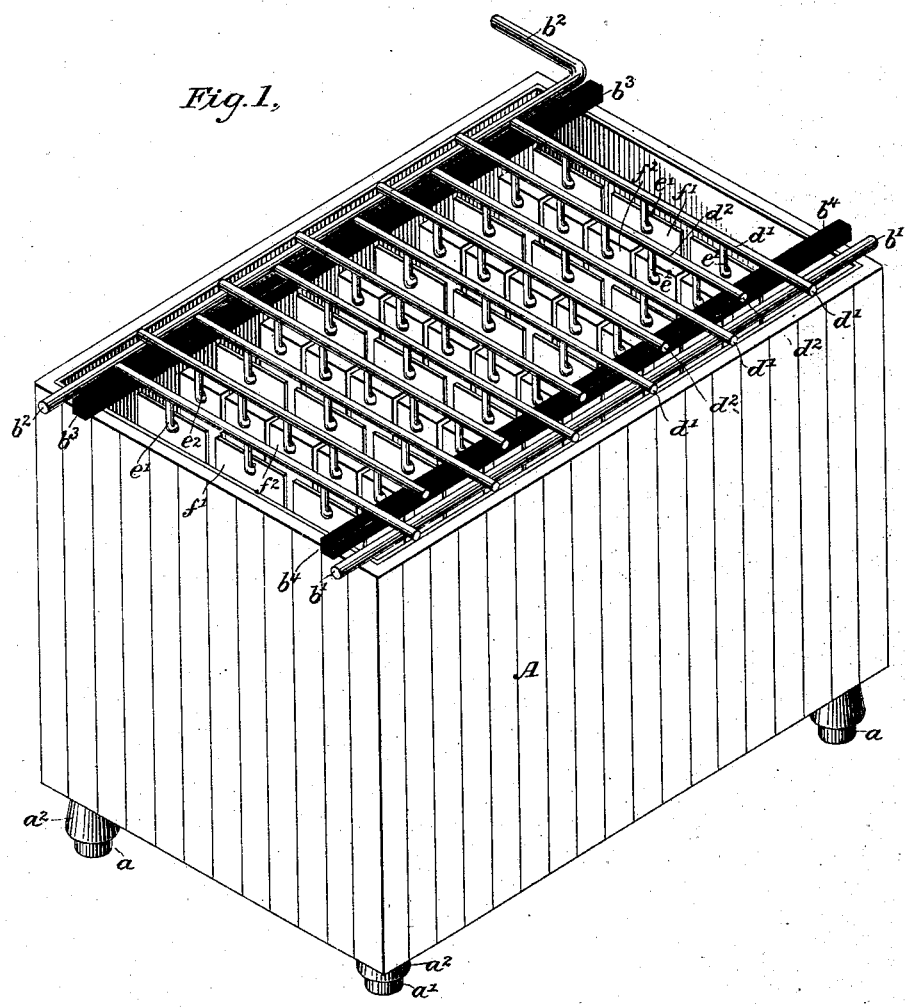
Witnesses
Wm A. Skinkle
Carrie E. Ashley
Inventor
Moses G. Farmer.
By his Attorneys
Pope & Edgecomb (No Model.) 3 Sheets—Sheet 2.
M. G. FARMER.
APPARATUS FOR REFINING COPPER BY ELECTROLYSIS.
No. 315,265. Patented Apr. 7, 1885.
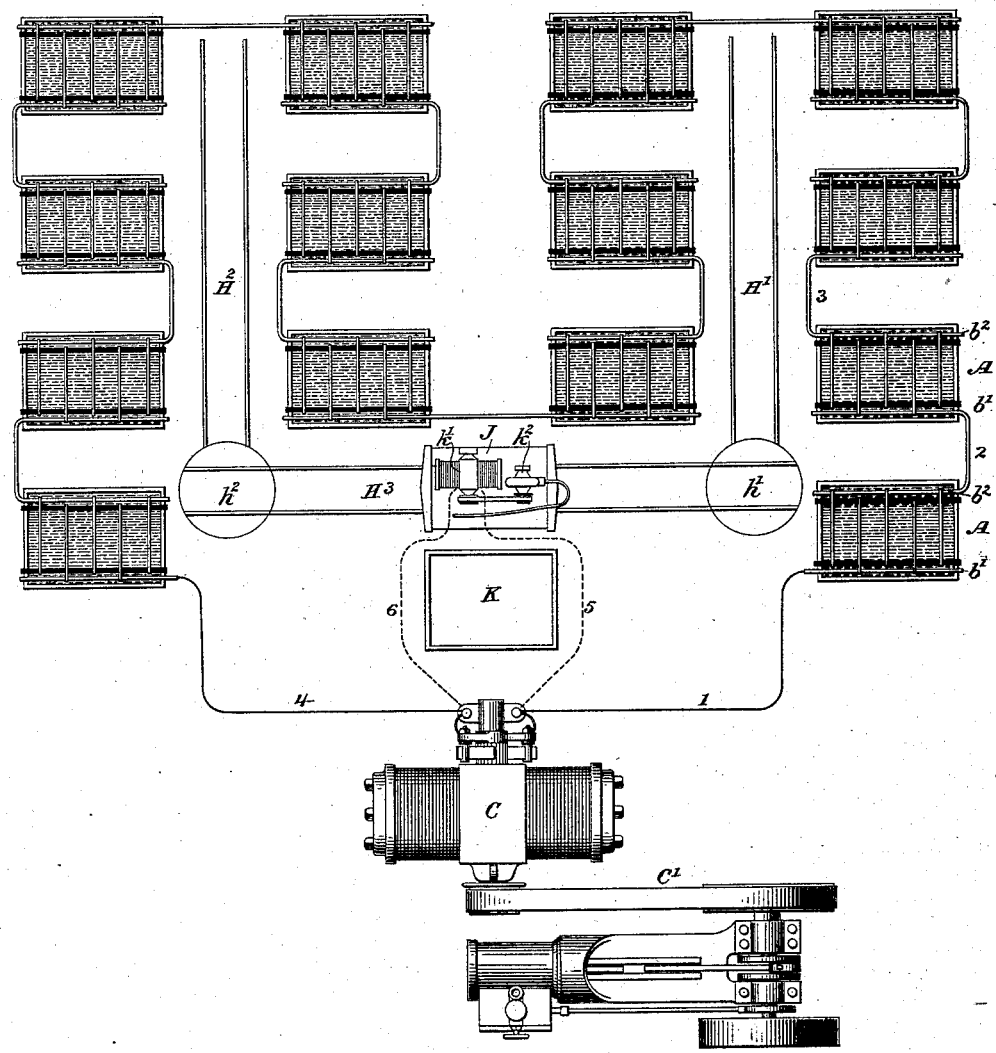

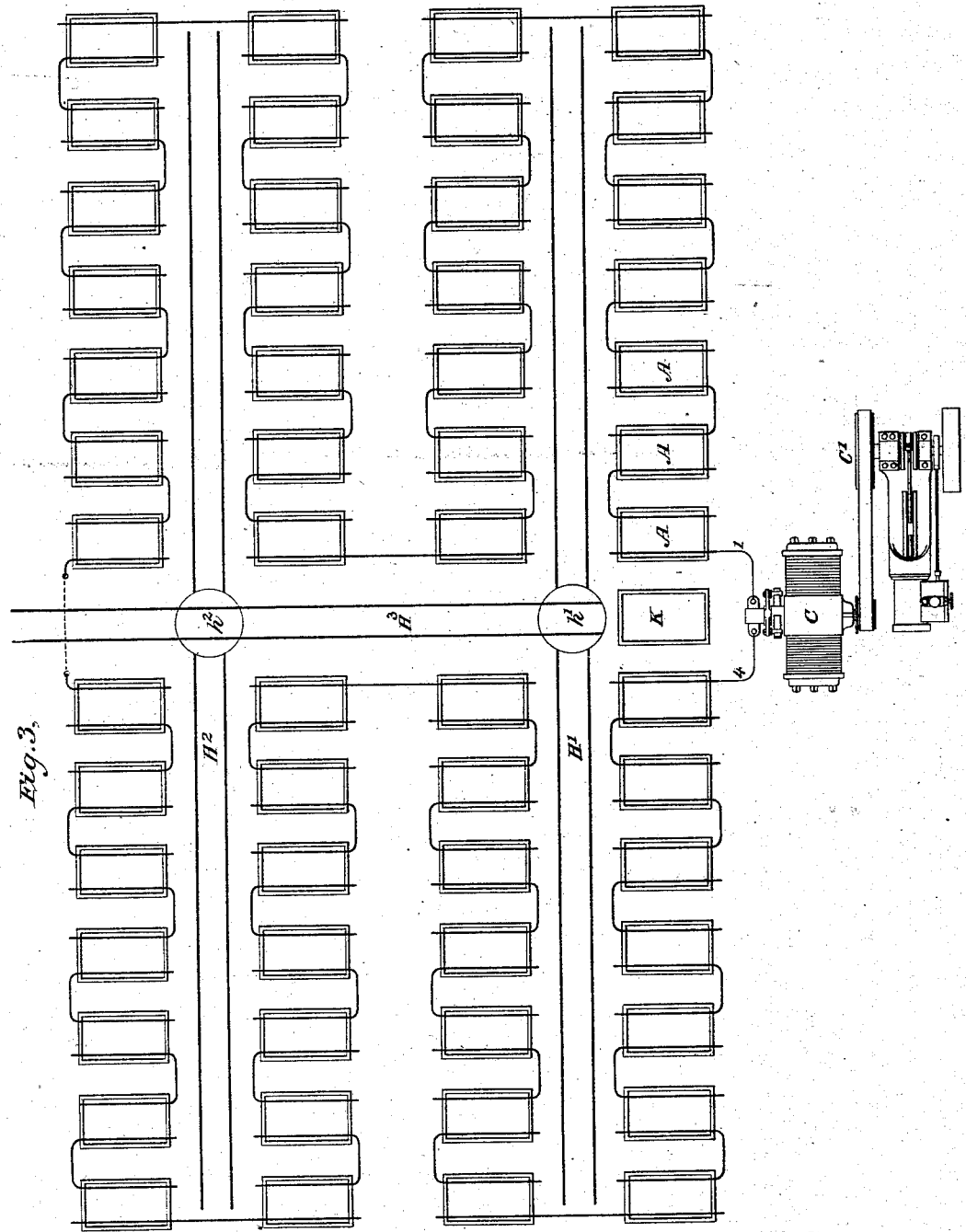

United States Patent Office.

MOSES G. FARMER, OF NEW YORK, N. Y.

APPARATUS FOR REFINING COPPER BY ELECTROLYSIS.

SPECIFICATION forming part of Letters Patent No. 315,265, dated April 7, 1885.

Application filed November 12, 1884. (No model.)

*To all whom it may concern:*

Be it known that I, MOSES G. FARMER, a citizen of the United States, residing in New York, in the county and State of New York, have invented certain new and useful Improvements in Apparatus for Refining Copper by Electrolysis, of which the following is a specification.

My invention relates to the class of apparatus employed for removing copper from its compounds and its ores by electrolysis.

The object of the invention is to provide a convenient form of vat in which to carry on the electrolytic action, to organize the same in such convenient relation to each other and to provide such means for supplying the ore and removing the metal and for replacing the electrolyte from several vats that the process may be carried on in an economical manner.

In carrying out the invention I prefer to construct each vat in a rectangular shape, and to provide it with two conducting-rods extending across its top, through which electric connections are made with a suitable source of electricity, two series of cross-rods having supporting-hooks for receiving the cathodes and anodes extending across the vat. One end of each of the rods of one series rests upon one of the conducting-rods, and likewise one end of each of the other series rests upon the remaining conducting-rod. The remaining ends of each series rest upon corresponding non-conducting rods or supports. The rods of the two series alternate with each other. From the one series of rods there are suspended plates of copper or other conducting material upon which it is designed that the metal shall be deposited. From the other series there is suspended the ore or matte which it is desired to reduce. The entire vat is supported upon non-conducting legs, which are preferably made in the form of inverted cups, each having a central projection upon which it rests. The vats thus constructed are arranged in series, and they are connected in series with a suitable source of electricity, preferably an electric generator of the dynamo type. The connections are preferably such that the current will enter at one end of the first vat and, having traversed the electrolyte, will find its way from the opposite end of that vat to the corresponding end of the next succeeding vat, and likewise from that vat at its opposite end. In this manner a more even distribution of the current throughout the vats is obtained.

Between the several rows of vats, in which the entire series is preferably arranged, there extends a suitable track upon which it is designed that a car shall move. This car is employed for supplying the ore or matte to the vats and for receiving the refined metal from the vats. The car carries a pump and an electric motor for actuating the pump. This electric motor may also be employed for driving the car, the rails of the track serving as conductors. The pump is employed for removing the electrolyte from the vats when it is desired to remove the ore and the sediment therefrom. To more economically accomplish this result, an extra vat is employed, and when the electrolyte is to be removed from the first vat it is pumped into this extra receiving-vat. The electrolyte in the second vat is afterward pumped into the first vat, and from the third into the second, and so on throughout the series, each vat being cleaned and replenished in turn until the entire series has been compassed, and the electrolyte in the extra vat is pumped back into the last vat in the series.

It has been proposed to mount a pump together with an electric motor upon a car, and of course no claim is herein made to such an organization itself, but only as employed in the general organization as hereinafter pointed out. Likewise the use of a track upon which a car carrying a pump may be moved among a series of vats is not broadly new, and no claim is made to it.

In the accompanying drawings, Figure 1 is a perspective view of a complete vat. Fig. 2 illustrates the organization of the apparatus, and Fig. 3 illustrates a slightly-different arrangement of plant.

Referring to these figures, A represents a vat, constructed of wood or other suitable material, such as is usually employed for like purposes. This vat is supported upon insulating-legs $a$, and these legs are preferably formed of cups $a^2$ of glass, hard rubber, or other suitable insulating material. They are preferably constructed with central projections, $a'$, around which project the flaring edges of the cups $a^2$. This construction insures the complete insulation of the vats from the floor and from other vats, and thus greatly economizes the electricity necessary to be employed in the plant. Two conducting-rods, $b'$ and $b^2$, rest upon the upper edges of the ends of the vat. One of these rods, $b'$, is designed to be connected with the positive pole of the battery or generator C, and the other, $b^2$, with the negative pole of the same. A series of conducting-rods, $d'$, are supported at one end upon the rod $d'$ and at the other end upon an insulated rod, $b^3$. A like series of conducting-rods, $d^2$, rest at one end upon the rod $b^2$, and at the other end upon an insulating-rod, $b^4$. Two series of rods are thus supported across the top of the vat; but the rods of the one series are insulated from those in the other, the rods in each series, however, being connected with each other through the corresponding rods $b'$ and $b^2$. The rods $d'$ preferably alternate with the rods $d^2$, as shown in the drawings. Each of the rods $d'$ and $d^2$ is provided with a series of hooks, $e'$ and $e^2$, respectively, from which the cathodes and anode of the vat are suspended.

In practice it is preferable usually to support conducting-plates $f^2$, of copper, carbon, or other conducting material, from the rods $d^2$, and the ore or matte itself may be supported from the other series of rods, $d'$, as shown at $f'$, or the ore may be supported in baskets or in any other convenient manner from this series of rods.

If the apparatus is employed for refining partially-purified copper, then the plates may be very readily supported from the second series of hooks.

The generator C is driven by any suitable form of engine, as indicated at C', and the current derived therefrom is led through the conductor 1 to the rod $b'$ of the first vat, A', of the series. The second rod, $b^2$, of this vat is connected with a rod, $b'$, of the second vat A$^2$. These rods $b^2$ and $b'$ may be permanently united, as shown, by the yoke or conductor 2; but the conductor 2 leads from the end of the vat A$^2$ opposite to that at which the conductor 1 enters. The rod $b^2$ of the second vat, A$^2$, is connected by a conductor, 3, in like manner with the rod $b'$ of the third vat, and so on throughout the series, each vat having its incoming and outgoing conductors leading from opposite ends. The last vat in the series is connected by a conductor, 4, with the remaining pole of the generator C.

In Fig. 2 I have represented a series of fourteen vats arranged in four rows, and a fifteenth vat, K, which serves as a receptacle for containing the electrolyte of the first vat when it is desired to remove the same for the purpose of cleaning the vat.

Between the first and second rows of vats there extends a track, H', and between the third and fourth rows a similar track, H$^2$. A track, H$^3$, extends from one of these tracks to the other. It is designed that a car, J, shall run upon these tracks, and this car is designed to furnish convenient means for transporting the ore and metal to and from the vats. For this purpose it is preferably equipped with an electro-magnetic motor, $k'$, which may be driven by an electric current supplied from the generator C through the rails of the vat in a well-known manner, conductors 5 and 6 being employed for this purpose.

At the intersection of the tracks running in different directions there are provided convenient turn-tables, $h'$ and $h^2$, which permit the car to be turned from one track to the other.

Upon the car J there is carried a pump, $k^2$, which is designed to be driven by the motor $k'$ when it is desired for removing the electrolyte from one vat and transferring it to another. Thus, when it is desired to clean the first vat, A', the electrolyte is pumped from that vat to the extra vat K by means of the pump $k^2$. When the vat A' has itself been put in order, the electrolyte is pumped from the vat A$^2$ into the vat A', and so on throughout the series.

Any suitable means may be employed for temporarily connecting the conductors around the vat which is being thus replenished—such, for instance, as conductors provided with a switch.

In Fig. 3 a slightly different organization of apparatus is illustrated, forty-two vats being shown, together with a supplementary vat K. These vats are arranged in four rows of fourteen each, and tracks H' and H$^2$ extend between the first and second and the third and fourth. A cross-track, H$^3$, extends along between the seventh and eight vat of each row.

The tracks are provided with turn-tables $h'$ and $h^2$, as in the organization shown in Fig. 2, and the operation of the several parts is essentially the same.

I claim as my invention—

1. A plant of electro-deposition consisting of a series of vats arranged in rows, tracks extending between the different rows, an electric generator having its opposite poles connected with the several vats in series, an electric motor, a car moved upon said track and driven by said electric motor, a pump also carried upon said car and actuated by said motor, and electrical connections from said generator with said electric motor.

2. The combination, substantially as hereinbefore set forth, of a series of vats, an electric generator supplying currents thereto, the track extending into proximity to each of said vats, the car moving upon said track, the electric motor carried upon said car, the pump actuated by said motor, and circuit-connections from said generator to said electric motor, whereby currents are supplied thereto.

In testimony whereof I have hereunto subscribed my name this 20th day of October, A. D. 1884.

MOSES G. FARMER.

Witnesses:
SARAH J. FARMER,
JOHN C. LANG.